Aug. 15, 1933.　　　B. F. RANDEL　　　1,922,217
REFRIGERATING MEANS AND METHOD
Filed Oct. 3, 1927　　　3 Sheets-Sheet 3
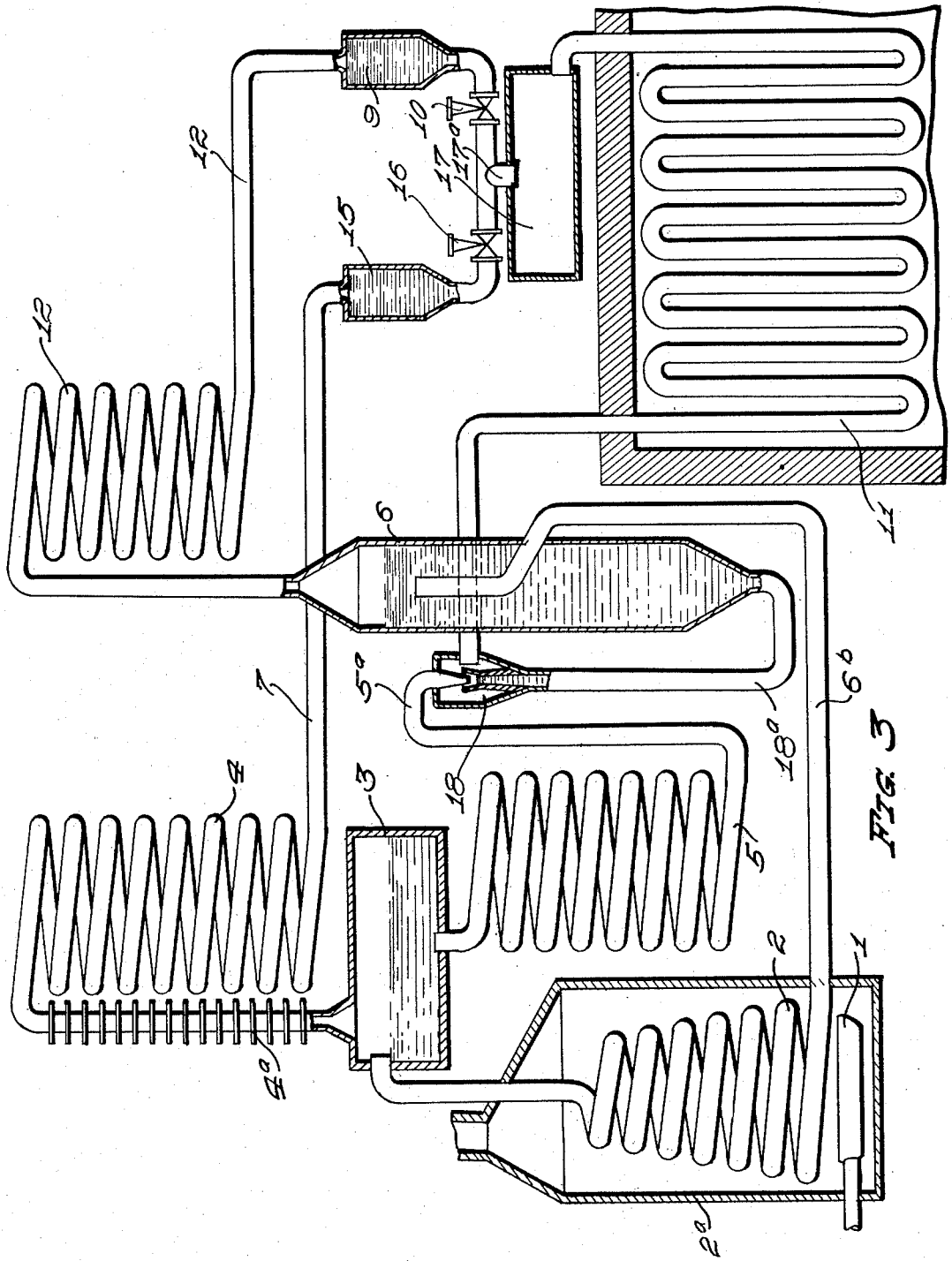
INVENTOR.
Bo F. Randel
BY A. B. Bowman
ATTORNEY Patented Aug. 15, 1933

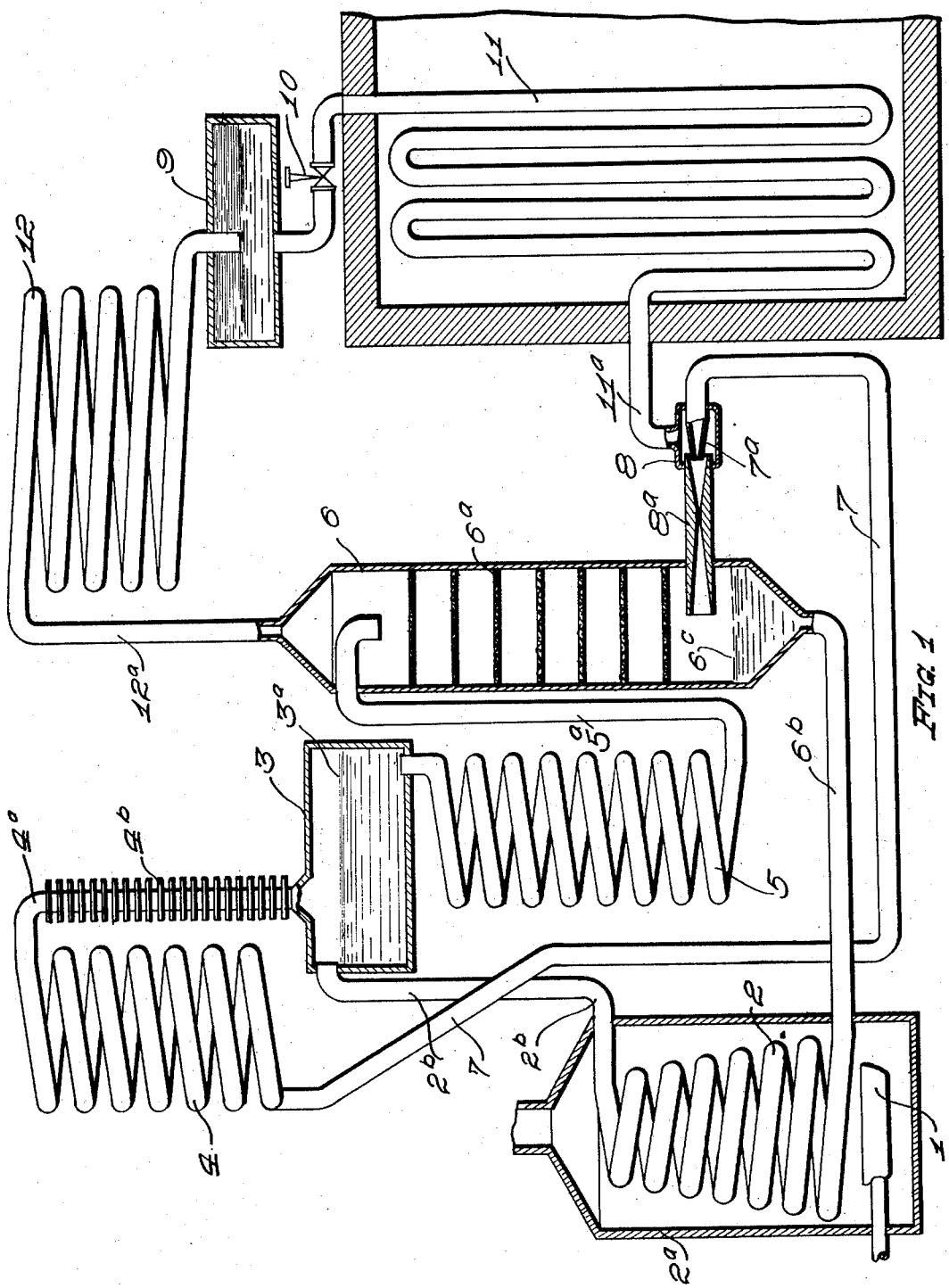

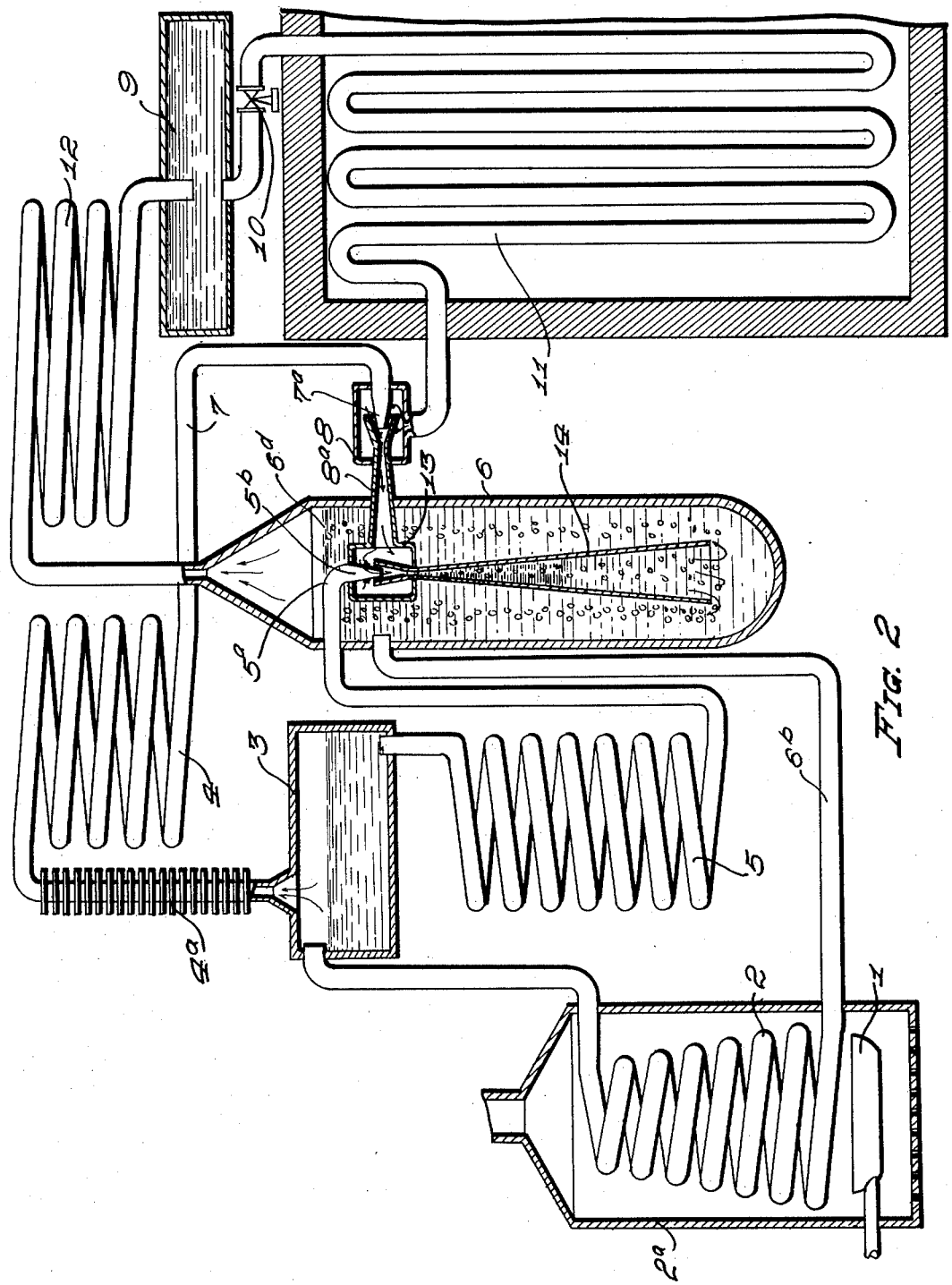

1,922,217

UNITED STATES PATENT OFFICE 1,922,217

REFRIGERATING MEANS AND METHOD

Bo Folke Randel, San Diego, Calif., assignor to Electrolux Servel Corporation, New York, N. Y., a Corporation of Delaware Application October 3, 1927. Serial No. 223,508

22 Claims. (Cl. 62—119.5)

My invention relates to chemical and absorption type refrigerating apparatus and the objects of my invention are: first, to provide a means of refrigeration in which the refrigerating medium after following the first steps of the refrigerating cycle is compressed as the result of the chemical interaction of two separate, independent fluids; second, to provide a process of this class in which the refrigerating medium passes through the refrigerating steps of the process before coming into contact with other fluids, the latter then coacting to cause compression of the refrigerating medium; third, to provide a process of this class in which the refrigerating medium employed completes the entire refrigeration cycle without chemical change and without absorption of the refrigerating medium by a secondary medium; fourth, to provide a process of this class in which a refrigerating medium is used which permits the operation of the system under a relatively low pressure and low condensing temperature; fifth, to provide a process of this class in which a hydrocarbon fluid is used as the refrigerating medium and a fluid, chemically inactive to the hydrocarbon fluid is used as a secondary medium; sixth, to provide a process of this class in which the refrigerating medium is allowed to pass through the refrigerating stage of the process and is then mixed with a secondary medium and then compressed by the removal of the secondary medium by chemical action with or absorption into a tertiary medium; seventh, to provide a process of the class described in which a refrigerating medium passes through the refrigerating cycle at a comparatively low pressure and without chemically interacting with other substances and a chemical substance which through the medium of heat forms a secondary and tertiary medium such that when the secondary medium and refrigerating medium are mixed and then brought into contact with the tertiary medium said secondary and tertiary mediums form a chemical substance thereby throwing the total pressure of the system on the refrigerating medium whereby the latter is compressed; eighth, to provide a process of this class in which a secondary medium is mixed with the refrigerating medium and brought into contact with a tertiary medium whereby the secondary medium is dissolved by the third medium and whereby through the medium of heat said secondary medium may again be freed from the tertiary medium; ninth, to provide a process of this class in which a primary refrigerating medium is mixed with a secondary refrigerating medium, in proportion to cause lowering of temperature, the primary and secondary mediums being chemically inactive towards each other, then removing of the secondary medium by introducing a tertiary medium with affinity to the secondary medium, then causing the total pressure to be assumed by the primary medium, leading said primary medium back to beginning of the cycle, and further by the application of heat to the combined secondary and tertiary mediums, separate same, leading said secondary medium back to the beginning of the cycle; tenth, to provide a refrigerating apparatus comprising a refrigerating circuit and a secondary circuit in which a portion of said circuit is common to both, while both circuits are hermetically sealed from the outside, and eleventh, to provide an apparatus of this description in which certain refrigerating and compression mediums may be used adapted to operate at relatively low pressure and low condensing temperature.

With these and other objects in view as will appear hereinafter my invention consists of certain novel pieces of construction, combination and arrangement of parts and portions as will be hereinafter described in detail and particularly set forth in the appended claims, reference being made to the accompany drawings and to the characters of reference thereon which form a part of this application in which:

Figure 1 is a diagrammatical view of the apparatus in which my refrigerating process is carried out, certain parts and portions of said apparatus being shown in section. Fig. 2 is a diagrammatical view of a modified form of my apparatus showing certain parts and portions in sections. Fig. 3 is a diagrammatical view of a further modification of my apparatus showing certain parts and portions in sections.

Similar reference numbers refer to similar parts and portions throughout the drawings.

The principal parts and portions of my apparatus comprise the burner 1, heating coil or generator 2, receiver 3, cooling coils 4 and 5, separator and chemical compressor or absorber 6, communication pipe 7, ejector chamber 8, refrigerating liquid receiver 9, expansion valve 10, refrigerating coil or evaporator 11, and condensing coil 12.

The heating coil 2 is connected by the tube 2b to a suitable receiver 3, the tube 2b entering said receiver at a point near the top thereof. An outlet in the top of the receiver in the form of a tube 4a which is provided preferably with fins 4b connects to a helical tube 4 which acts as a cooling means and is connected to the ejector chamber 8 by means of the tube 7. A second outlet is placed in the bottom of the receiver 3 and is connected to a cooling tube 5, which may also be of helical form, and the latter is connected by means of a tube 5a to the top of the separator and chemical compressor 6. The latter is preferably in the form of a cylinder and is provided with a plurality of horizontal screens 6a placed at suitable intervals within the cylinder, or may be filled with mineral wool. The tube 5a enters the cylinder 6 at a point near the top of said cylinder. The tube 6b leads from the bottom of the cylinder to the bottom of the heating coil 2. The tube 7 terminates in a nozzle 7a extending within the ejector chamber and the latter is connected by a mixing tube 8a with cylinder 6 at a point near the bottom thereof. A liquid receiving container 9 is connected by means of a suitable tube to the expansion valve 10, the latter being connected to the refrigerating coil 11. The refrigerating coil 11 is connected by means of a tube 11a to the ejector chamber 8.

The refrigerating circuit of this apparatus comprises the liquid receiving chamber 9 into which the refrigerating medium, preferably butane or other hydrocarbon gas, is introduced in liquid form under pressure. This liquid is then expanded through the valve 10 and allowed to pass in the form of vapor into the refrigerating coil 11 from which is passes through the tube 11a to the ejector chamber 8. Before completing the refrigerating circuit it is desirable to describe the second circuit in which the heating coil 2 may be considered the initial member. This coil contains a solution of potassium bicarbonate and water and is heated by means of the burner 1, or any suitable means of heating may be employed. It is obvious that other similar chemical solutions may be employed. The application of heat causes the solution to decompose into a solution of potassium carbonate and free carbon dioxide gas according to the formula:

$$2KHCO_3 \rightarrow K_2CO_3 + CO_2 + H_2O$$

The potassium carbonate ($K_2CO_3$) may then react with water according to he formula:

$$K_2CO_3 + 2H_2O \rightarrow 2KOH + H_2CO_3$$

and the following reaction may also take place:

$$H_2CO_3 \; H_2O + CO_2$$

Each of the above reactions is caused to take place in the direction indicated by the application of heat and will take place in the opposite direction upon the withdrawal of heat. Whether one or both of the last two reactions will occur depends on the temperature and whether or not they do occur is not essential for this invention because if the temperature is raised sufficiently to cause the first reaction to take place $CO_2$ and a solution will result which will recombine when the temperature is reduced. This mixture rises in the connection tube 2b and collects in the receiver 3. At this point the gas and the solution separate. The gas rising through the tube 4a to enter the cooling tube 4 while the liquid potassium carbonate flows through the cooling tube 5 and enters cylinder 6. Any water vapor that may be drawn along by the carbon dioxide gas is condensed in tube 4a which is provided for this purpose with the fins 4b to facilitate condensing and cooling of the water vapor. This water then trickles back into the receiver 3. The potassium carbonate solution is maintained at a level 3a in the receiver 3 and the outlet pipe 5a enters the cylinder 6 at this level. The hot solution of potassium carbonate is cooled in passing through the cooling coil 5 and trickles from the tube 5a onto the screen 6a within the cylinder 6, thence passing in a fine spray downwardly through the screens until it reaches the bottom of the cylinder 6 at which a level 6c is maintained. The carbon dioxide, after cooling off in the cooling coil 4, passes through the tube 7 to the ejector chamber 8 where it is expanded through the nozzle 7a and passing thence through the mixing tube 8a into the bottom of the cylinder 6. In passing through the ejector chamber 8 the dioxide gas draws with it the refrigerating gas from the refrigerating coil 11, these two gases being mixed in the tube 8a. Due to the velocity of the carbon dioxide gas through the ejector chamber 8 a partial vacuum will be formed in the refrigerating coil 11 which will cause the evaporation of the butane gas therein from liquid to gas form thereby causing a lowering of the temperature. The mixture of butane and carbon dioxide gases will rise through the cylinder 6a and thereby will come into close contact with the descending spray of potassium carbonate solution. The latter is in a suitable condition to chemically combine with the carbon dioxide gas while the butane gas cannot enter into any chemical combination with potassium carbonate or potassium bicarbonate and at the same time is insoluble in water. The butane gas will therefore be freed from the carbon dioxide gas and will collect in the top of the cylinder 6 at which point it will assume the total pressure of the system. During the upward passage of the butane gas in the cylinder 6 it will acquire a certain increase in temperature owing to the liberation of heat due to the chemical process taking place in the cylinder and due to the compression action on the butane gas. This heat is sufficient to retain the butane gas in gas form under higher pressure while it rises through the pipe 12a into the cooling and condensing coil 12 where it is cooled sufficiently to liquefy and then returns to the receiving container 9 thereby completing the cycle of refrigeration. The potassium carbonate and carbon dioxide gas form a solution of potassium bicarbonate in the bottom of the cylinder 6 which flows from there through the tube 6b back to coil 2. It will be readily understood that in my apparatus other combinations than that of butane gas for the refrigerating medium and carbon dioxide for the secondary medium could be used such as combinations of methyl or ethyl chloride and nitrogen gas, methyl ether, isobutane, marsh gas, ammonia, sulphur dioxide, etc., which combinations would work equally as well. It should be noted however that in each case the pressure of the system will vary according to the nature of the refrigerating gas used. In the use of butane gas a comparatively low pressure only is required so that it is possible to construct my apparatus of brass or copper tubes which greatly facilitate the construction thereof. Due to easy liquefaction of this gas under ordinary temperature, water cooling will not be required, thus simplifying the construction of the apparatus. It will be noted in the system described above that there is neither absorption nor chemical action of the refrigerating medium. The refrigerating medium is compressed in consequence of a chemical process which follows the mixing of the refrigerating gas with a secondary gas and the chemical combination of said secondary gas with a tertiary medium. The pressure sustained by said secondary gas is shifted to the butane gas thereby imposing the total pressure thereon and compressing the latter. In this preferred form the secondary medium, namely the carbon dioxide gas, is not absorbed but is actually chemically combined with the third medium. As a matter of further illustration how my apparatus and arrangement will work with other mediums, a combination of butane or other similar inert hydrocarbon fluid, ammonia and water will be used.

The refrigerating circuit of the apparatus now comprises the liquid receiving chamber 9 into which the refrigerating gas is introduced in liquid form under pressure. This liquid is then expanded through valve 10 and allowed to pass in the form of vapor into refrigerating coil 11 to which it passes through tube 11a to ejector chamber 8.

The secondary medium, ammonia gas in solution in water, which water is the tertiary medium is heated by means of burner 1. The application of heat causes the ammonia gas to be set free from the solution, rising with the water up to receiver 3. At this point the gas and water separate. The gas rises through the tube 4a to enter the cooling tube 4, while the water flows through the cooling tube 5 and enters cylinder 6. The ammonia gas confines its cycle in a similar way to the cycle of carbon dioxide gas described before, and similarly mixes with the butane or other refrigerating medium in ejector chamber 8 to be reabsorbed and removed from the mixture in cylinder 6 by the descending water, thus compressing the refrigerating medium to the total pressure of the system. It is to be noted that the ammonia gas used in this apparatus is not the refrigerating medium itself. The special attention is called to this because ammonia gas is so commonly used as a refrigerant in both compression and absorption systems.

It is evident that any combinations of mediums may be used provided they have the following chief characteristics: The refrigerating medium should be stable and inert and should not easily form chemical combinations with or be absorbed in any of the other mediums. The secondary medium should be a fluid which is readily attracted to a tertiary medium to form chemical combinations with this tertiary medium or be absorbed in same. Butane, isobutane, or other similar hyrocarbons are especially suited as refrigerating mediums. Ammonia, carbon dioxide gas, or sulphur dioxide; and water, or potassium carbonate in solution, are especially suited as secondary and tertiary mediums, respectively.

The operation and method of my refrigerating means and method is as follows: Through the application of heat to a generator 2, a certain high pressure is maintained constant in the high pressure side of the apparatus, and a gas dissolved in a liquid is driven out of this liquid. Also a general circulation of the liquid and the gases in the system is created by the application of this heat and the elevation of the liquid to a high point by a "percolator" principle, allowing same to flow by gravity to point of beginning.

The gas driven out of the liquid is led into a mixing chamber 8, where it is mixed with a refrigerating medium in vapor form coming from an evaporation and cooling coil 11 inside the refrigerator. The liquid trickling down an absorber 6 through the mixture of gases coming from mixing chamber 8 will reabsorb the gas driven out of the solution in the generator. The total pressure of the system will thus be assumed by the remaining refrigerating medium, which is inert to both the liquid and the gas absorbed in said liquid. This refrigerating medium will be compressed and it will collect in condenser 12, where it will liquefy and finally collect in receiver 9. From this point it is led through expansion valve 10 to the evaporator 11. The lower pressure in evaporator required for the evaporation of the liquefied refrigerating medium is caused by the ejector action in mixing chamber 8. The gas from receiver 3 has a certain velocity through nozzle 7a. It will carry with it vapors from coil 11 through 11a. When the combined gases meet the liquid in absorber 6, due to the sudden absorption of the secondary gas into the liquid, a localized lowering of pressure will occur at the lower end of absorber, causing an increase of velocity of gases through 8a and a reduction of pressure in evaporating coil.

In my modified form illustrated in Fig. 2, I employ a different method of introducing the solution of potassium carbonate into the cylinder 6. The tube 5a is provided with a nozzle 5b and forms with the chamber 13 an ejector. A diverging tube 14 extends axially downward from the chamber 13 while the mixing tube 8a communicates with the chamber 13. The tube 6b is connected with the cylinder 6 at a point close to the top thereof. In other respects this apparatus is identical with that shown in Fig. 1. In the operation of this modified form the solution of potassium carbonate enters the chamber 13 through the nozzle 5b and passes downward through the diverging tube 14 into the cylinder 6. The level of the liquid is maintained at 6d in the cylinder 6. The butane gas enters the chamber 8 and is drawn by the action of the carbon dioxide through the mixing tube 8a and then into the chamber 13. In passing through the diverging tube 14 the Potassium carbonate again chemically combines with the carbon dioxide gas. In doing so a partial vacuum is formed in the chamber 13 causing a high velocity and suction from the ejector 8. Potassium bicarbonate solution will form in the cylinder 6 and the butane gas will bubble through this solution and rise to the top of the cylinder where it will assume the total pressure of the system and pass to the cooling and condensing coil 12 and back to the liquid receiving container 9 as previously described. The potassium bicarbonate solution will pass through the tube 6b back to the heating coil 2.

In the modification illustrated in Fig. 3 I employ as secondary and tertiary mediums a solution of a suitable gas such as sulphur dioxide or ammonia, etc., in water and as a refrigerant butane gas or a similar gas. The apparatus in which I carry out this modified process is constructed along the same lines as that of the previously described apparatus except that the cooling tube 4 is connected by means of the connecting tube 7 to a liquid receiving means 15 as in this process the gas will liquefy in the cooling tube 4 if a sufficient pressure is maintained. The butane gas is retained in liquid form in the cooling coil 12 and the receiver 9. Both the receiver 9 and the receiver 14 are connected by means of a common tube 17a to a mixing chamber 17 and expansion valves 10 and 16 are interposed between the mixing chamber 17 and the receiving containers 9 and 15 respectively. By proper adjustment of the expansion valves 10 and 16 I cause the two liquified gases contained in the receivers 9 and 15 to evaporate and mix in the mixing chamber 17. From the mixing chamber 17 the two gases will pass through the refrigerating coil 11 into the ejector 18 and from there will be drawn into the cylinder 6. The water which remains in the receiver 3 will pass through the cooling coil 5 into the ejector 18 in which a partial vacuum will be formed creating thereby a suction on the mixture of the butane gas and sulphur dioxide or ammonia in the refrigerating coil 11. The secondary medium which with the butane gas passes through the water in the cylinder 6 will be dissolved by the water while the butane gas will be free and pass into the upper end of the cylinder 6 at which point it will assume the total pressure of the system and will then pass as previously described into the cooling tube 12 and then back to the receiver 9, while the sulphur dioxide or ammonia solution in the cylinder 6 will pass through the connecting tube 6b back to the heater coil 2. It should be noted that the sulphur dioxide or ammonia or any other suitable secondary gas employed may not be employed in any way as a refrigerant but may be introduced into refrigerating coil 11 as a pressure equalizing gas without having been liquefied in cooling coil 14. This will be the case if the pressure in the apparatus is below that required to liquefy the secondary gas at the temperature of the cooling coil 4. The secondary gas should be one which has an affinity for water or other tertiary medium employed and is inactive with respect to butane gas or any other refrigerant medium used, which latter gas is the refrigerant medium. The chief function of the secondary medium is to enable the refrigerant to be compressed as a result of the secondary medium with which the refrigerant medium is mixed being absorbed by the tertiary medium used, whereby the total pressure of the system, which is the sum of the pressures on all the mediums, is transferred to the refrigerant medium alone, the latter thereby assuming this total pressure in the system thus completing the cycle of refrigeration.

However, in addition to the above it should further be noted that in the modification shown in Fig. 3 both mediums, the refrigerant proper and the secondary medium may be used as refrigerants if the pressure in the apparatus is high enough to liquefy the secondary medium in cooling coil 4, as previously described. By proper manipulation of pressures and temperatures and expansion valves 10 and 16 the two gases kept in liquid form may be evaporated so as to enable each to act as a refrigerant, thus materially increasing the effect of the apparatus.

It will be understood that in all three systems described that the refrigerating process continues automatically as long as heat is applied to the medium contained in the heating coil 2. It should also be noted that no heat whatever is applied to the primary refrigerating agent other than that caused by chemical action and compression within the cylinder 6.

Though I have shown and described a particular process and certain modifications, I do not wish to be limited to this particular process or to the modifications but desire to include in the scope of my invention the processes substantially as set forth in the appended claims.

Having thus described my invention, what I claim as new and desire to secure by Letters Patent is:

1. In a refrigerating apparatus, in combination, a generator for decomposing a solution into a liquid and a vapor, means to liquefy said vapor, an evaporator, means to introduce the liquefied vapor at a reduced pressure into said evaporator, means including a condenser for introducing another liquefied vapor inert with respect to said first mentioned liquid into said evaporator whereby both liquids evaporate, an ejector actuated by said first mentioned liquid for withdrawing vapor from said evaporator, a vessel into which said vapor and liquid are delivered, a conduit connecting said vessel with said generator and a conduit connecting said vessel with said evaporator.

2. The method of refrigeration which comprises separating a gaseous secondary medium from a solution thereof, condensing a refrigerant, evaporating the secondary medium and the refrigerant in the presence of each other to produce refrigeration, circulating the solution from which said secondary medium has been separated, utilizing said circulating solution to maintain a low pressure to aid the aforesaid evaporation, absorbing the secondary medium from the evaporated mixture, separating and again condensing the refrigerant and again separating the secondary medium.

3. The method of refrigerating which comprises evaporating a plurality of substances in liquid form in the presence of each other to form a gas mixture, compressing fluid of the mixture, separating the substances from each other, and separately condensing the substances.

4. The method of refrigerating which comprises separating ammonia in gaseous form from a solution thereof, condensing the ammonia, mixing the condensed ammonia with liquid butane, evaporating the liquid mixture, compressing vapor resulting from the aforesaid evaporation, absorbing the ammonia into solution, separating the butane from the solution, condensing the butane, again separating the ammonia from the solution and condensing the same and again mixing the ammonia and butane condensates.

5. That improvement in the art of refrigerating which consists in evaporating a plurality of fluids in the presence of each other, compressing vapor thus produced, bringing the fluids into contact with a medium having a greater affinity to one of the fluids of the mixture than another so that one fluid is absorbed and another is liberated and liquefying the liberated fluid to adapt it to be evaporated for obtaining refrigeration.

6. That improvement in the art of refrigeration which consists in evaporating a plurality of fluids in the presence of each other, compressing vapor thus produced, bringing the fluids into contact with a medium having a greater affinity to one of the fluids of the mixture than another so that one fluid is absorbed and another is liberated, liquefying the liberated fluid, separating the absorbed fluid from said medium and introducing the last separated fluid into the presence of the liquefied liberated fluid.

7. A refrigerating system comprising a generator, an absorber, an evaporator, a plurality of condensers and expansion valves, means to supply fluid to said condensers from said generator and from said absorber, means to conduct fluid from said condensers through said expansion valves to said evaporator, a conduit connecting said evaporator with said absorber, an ejector interposed in said conduit, means for circulating liquid from said generator through said ejector to said absorber and means for circulating liquid from said absorber to said generator.

8. Refrigerating apparatus comprising a generator, a rectifier, a condenser, an expansion valve, an evaporator, an ejector, and an absorber forming a circuit for a secondary medium and a second circuit for a refrigerant comprising said evaporator, said ejector, said absorber, a second condenser, a second expansion valve, means for supplying liquid from said generator to said ejector to actuate said ejector to cause flow of vapor from said evaporator to a region of higher pressure in said absorber, means to conduct liquid from said absorber to said generator and means to heat said generator.

9. A refrigerating system comprising a generator, an evaporator, an absorber, a plurality of condensers, a plurality of expansion valves, means to conduct vapor from said generator into one of said condensers, and to conduct liquid from said one of said condensers through one of said expansion valves to the evaporator, means to conduct vapor from said absorber to another of said condensers and liquid from said other of said condensers through another of said expansion valves into said evapoartor, an ejector to withdraw gaseous fluid from said evaporator and force it into said absorber, means to conduct absorption liquid from said generator to said ejector and from said ejector to said absorber, means to conduct fluid from said absorber to said generator and means to heat said generator.

10. A refrigerating apparatus comprising a receiver, an evaporator communicating with said receiver, an expansion valve between said receiver and said evaporator, means for supplying a refrigerant under an initial pressure to said receiver, means for maintaining a reduced pressure in said evaporator and chemical compression means for compressing the refrigerant to said initial pressure.

11. A refrigerating apparatus comprising a receiver, an evaporator communicating with said receiver, an expansion valve between said receiver and said evaporator, means for supplying a refrigerant under an initial pressure to said receiver, an ejector for maintaining a reduced pressure in said evaporator, means for mixing an auxiliary gas with said refrigerant and means for separating said gas from said refrigerant by absorption whereby said refrigerant reassumes said initial pressure.

12. The process of refrigeration which comprises evaporating a refrigerating medium in the presence of a secondary medium chemically inert with respect to the refrigerating medium and in heat exchange relation with a body to be cooled, withdrawing the resultant gas mixture from said heat exchange relation due to velocity of a fluid, and dissolving the secondary medium in a liquid having affinity thereto but inert with respect to the refrigerating medium whereby the refrigerating medium is liberated and made to assume the total existing pressure.

13. A process of refrigeration which comprises lowering the pressure of a refrigerating medium and introducing the refrigerating medium into the presence of a secondary medium chemically inert with respect to the refrigerating medium and in heat exchange relation with a body to be cooled, compressing vapor thus produced and withdrawing the same from said heat exchange relation due to velocity of a fluid, and dissolving the secondary medium in a liquid having affinity thereto but inert with respect to the refrigerating medium whereby the refrigerating medium is liberated and made to assume the total existing pressure.

14. In a refrigerating system, means for maintaining a refrigerant in vaporizable state, means for lowering the pressure of the refrigerant to vaporize the same, means for decomposing a chemical combination by heat into a gas and a liquid, means for introducing the gas into the presence of the refrigerant, and means to compress said refrigerant and cause the gas and liquid to chemically combine and to liberate the refrigerant whereby the latter assumes the initial pressure.

15. In a refrigerating system, means for maintaining a refrigerant at elevated pressure in vaporizable state, means for causing a drop in temperature by expanding the refrigerant, means for decomposing a solution into a gas inert with respect to said refrigerant and a liquid, means for mixing said gas with said refrigerant, and means for compressing the refrigerant and dissolving the gas in the liquid, whereby the refrigerant reassumes the first mentioned pressure.

16. The process of refrigeration which consists in expanding two mutually chemically inert refrigerating mediums from liquid form to vapor form in a suitable chamber common to both and thereby producing a gaseous mixture, utilizing the velocity of a fluid to remove the gas mixture from the chamber and to compress fluid of the mixture, separating the vapors from each other by introducing a tertiary medium with a strong affinity to one of the refrigerating mediums, separating one of the refrigerants from the tertiary medium by the application of heat, and cooling and condensing the two refrigerants to liquid form.

17. Refrigerating apparatus comprising a generator, a condenser, an evaporator and an uncooled absorber forming a circuit for a cooling agent and a second circuit for an auxiliary agent comprising said evaporator, said absorber and a second condenser through which the auxiliary agent passes from the absorber to the evaporator.

18. The method of refrigerating which comprises separating a gaseous cooling agent from a solution thereof, condensing the cooling agent, condensing an auxiliary agent, evaporating the cooling agent and the auxiliary agent in the presence of each other to produce refrigeration, absorbing the cooling agent from the evaporated mixture under a temperature sufficiently high to substantially prevent condensation of the auxiliary agent, separating and again condensing the auxiliary agent, and again separating the cooling agent.

19. A process of refrigeration consisting in passing a refrigerating medium through the expansion and refrigerating steps, then mixing the refrigerating medium with a mutually chemically inert secondary gas, and then removing said gas whereby said refrigerating medium is made to assume a pressure sufficient to compress it.

20. A process of refrigerating consisting of expanding a refrigerant, then mixing the refrigerant with a mutually chemically inert secondary gas in a mixing chamber, and then chemically combining said secondary gas with a tertiary medium in a compression chamber whereby said refrigerant assumes the total pressure previously sustained by the gases in mixture.

21. A process of refrigeration consisting in passing a refrigerating medium which is under suitable initial pressure through the expansion and refrigeration steps, then causing the refrigerant to be compressed as a result of the chemical action of an associated gas with a third medium.

22. That improvement in the art of refrigeration which consists in bringing a mixture of fluids into contact with a medium having a greater affinity to one of the fluids of the mixture than another so that one fluid is absorbed and another is liberated while utilizing heat given off to maintain the temperature sufficiently high to substantially prevent condensation of the liberated fluid and without external cooling, and liquefying the liberated fluid to adapt it to be evaporated for obtaining refrigeration.

BO FOLKE RANDEL.